Sept. 13, 1932.                M. LICHTER                1,876,982
                               HANDLE BOX
          Filed Aug. 14, 1929         2 Sheets-Sheet 1
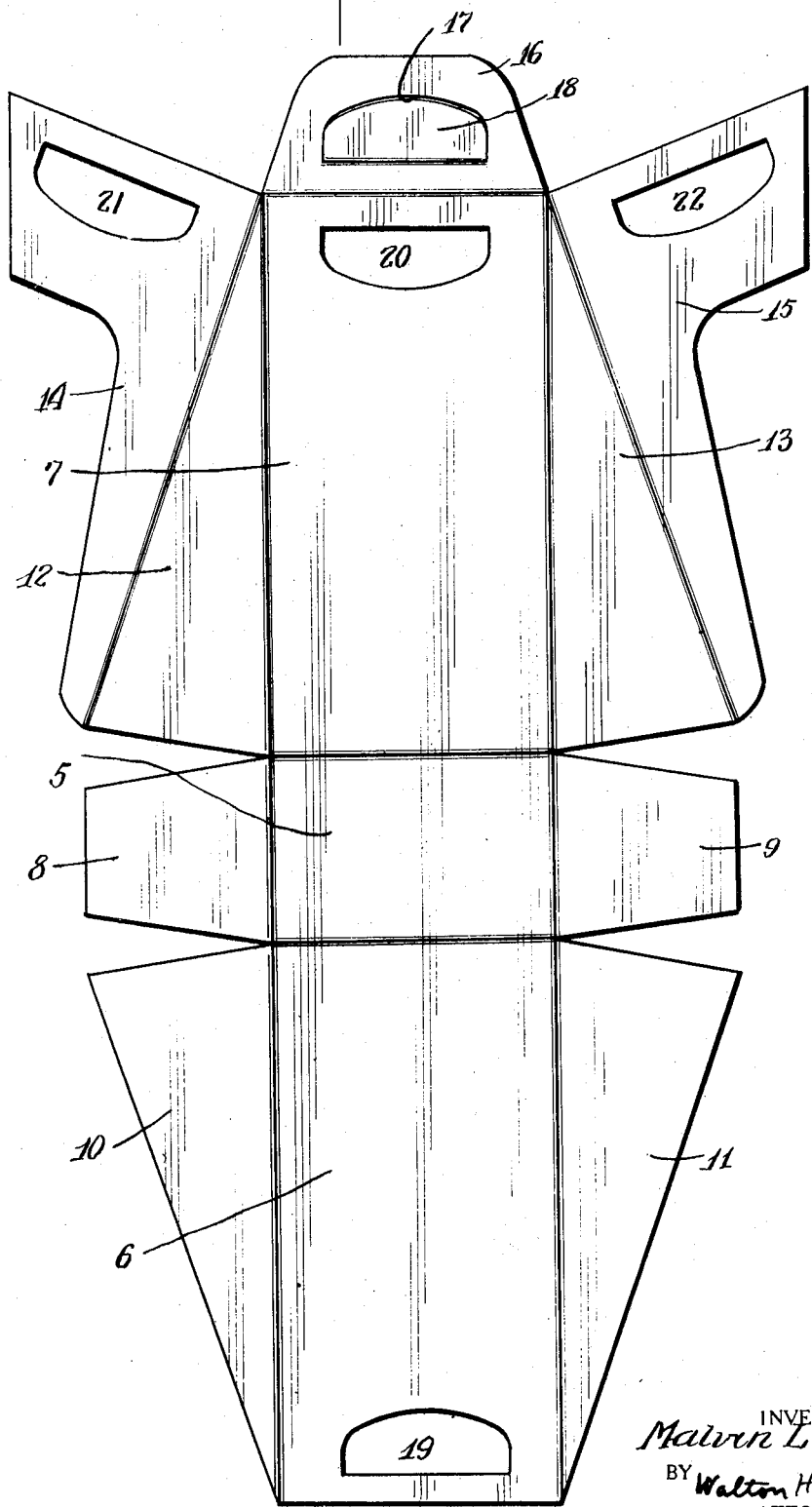

Sept. 13, 1932.　　　　M. LICHTER　　　　1,876,982
HANDLE BOX
Filed Aug. 14, 1929　　2 Sheets-Sheet 2
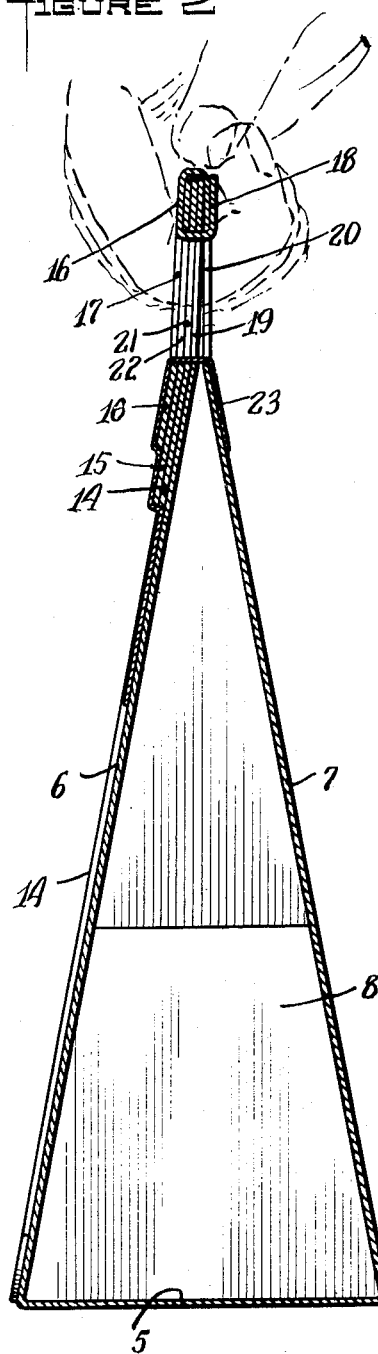
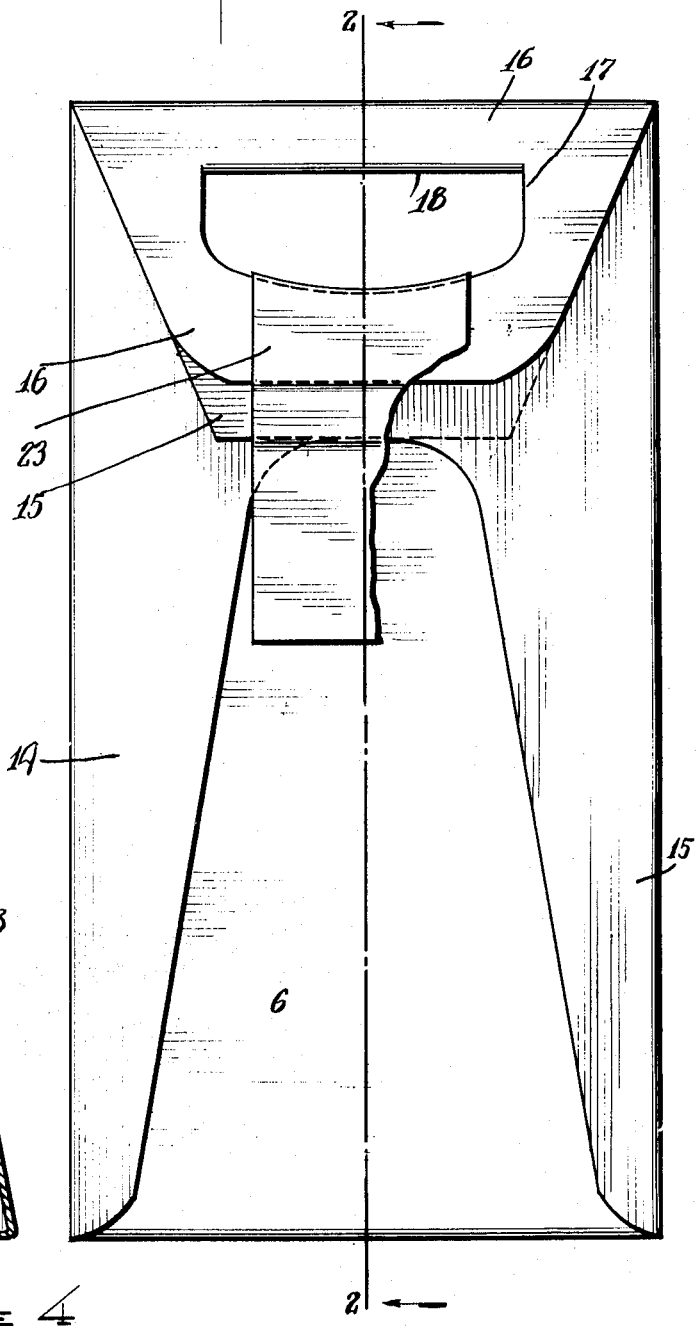
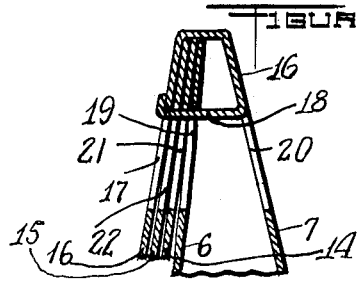
INVENTOR
Malvin Lichter
BY Walton Harrison
ATTORNEY Patented Sept. 13, 1932

1,876,982

UNITED STATES PATENT OFFICE

MALVIN LICHTER, OF NEW YORK, N. Y., ASSIGNOR TO THE STICKLESS CORPORATION, A CORPORATION OF NEW YORK

HANDLE BOX

Application filed August 14, 1929. Serial No. 385,940.

My invention relates to handle boxes; that is, to boxes provided with handles and in which the handle is formed or made up of a part of the box.

More particularly stated, I seek to produce a box made of sheet material, and so formed that all parts of the box, including the handle thereof, are made up of practically a single integral blank, formed into shape with a minimum of operations.

Again, my invention relates to a handle box made up somewhat like a bag, and in which the material is so formed and arranged that when the box is new and before it is subjected to strains and wear its shape is approximately what it tends to become afterward, due to its continued use.

My invention also comprehends a box made up of sheet material, and so formed as to have a maximum of strength and durability, combined with extreme simplicity.

My invention further contemplates a box made of sheet material and having appropriate form for housing a number of bottles, such as are commonly used for non-intoxicating liquors, but without disclosing the presence of the bottles.

In addition, my invention relates to a number of improvements in boxes and box handles, for increasing the general efficiency thereof.

Reference is made to the accompanying drawings forming a part of this specification, and in which like reference characters indicate like parts throughout all of the figures.

Figure 1 is a plan view of the blank, as cut and scored and ready to be formed into my improved handle box.

Figure 2 is a substantially central vertical section through my improved handle box, and is taken on the line 2—2 of Figure 3, looking in the direction indicated by the arrows.

Figure 3 is a front elevation of the handle box, one part being partially broken away.

Figure 4 is a fragmentary vertical section, showing a modified form of my device.

I will first describe the blank, shown in Figure 1. This blank is made of a single piece of sheet material, such as paper, cardboard, sheet metal, leather or leatheroid, and is creased or scored, as shown.

The middle portion 5 of the blank is substantially rectangular in form, and is used as the bottom or floor of my improved handle box.

Extending from one side of the bottom portion 5 is a front leaf 6, and extending in the opposite direction is a back leaf 7.

Extending in opposite directions from the ends of the bottom 5 are a pair of bottom leaves 8 and 9.

Extending in opposite directions from the front leaf 6 are a pair of side leaves 10 and 11, each of triangular form.

Extending from opposite sides of the back leaf 7 are a pair of side leaves 12 and 13, each of triangular form; and from these side leaves extend a pair of overlapping front leaves 14 and 15.

From the back leaf 7 extends a top leaf 16. This top leaf is provided with an opening 17, made by partially cutting out a portion 18, this portion 18 having the form of a flap and being used as a wear leaf, as hereinafter more fully described.

The various leaves 6, 7, 14 and 15 are severally provided with openings 19, 20, 21 and 22, each of these openings coinciding in form with the opening 17.

In this particular instance each of the openings has the form of a slot, one edge of which is straight and the other curved, but this exact form for the slot is immaterial, and it can be given any other suitable form.

At 23 is a strip of gummed paper or other flexible sheet material. It should be tough and durable, and preferably rather thin, in order to distribute strains as near equally as possible. This gummed strip 23 is independent of the blank shown in Figure 1, and need not be necessarily used in my device.

In forming the blank shown in Figure 1, I first bend up the bottom leaves 8 and 9, then bend up the back leaf 7 and the front leaf 6; next I bend the side leaves 10 and 11 to cover the bottom leaves 8 and 9; next I bend the side leaves 12 and 13 to cover the side leaves 10 and 11; and then I fold over the front leaf 14 and the front leaf 15.

This done, so that the several openings 17, 19, 20, 21 and 22, are now in registry with each other, the wear leaf 18, which is integral with the top leaf 16, is thrust directly through the various openings just mentioned, and brought up to the top, as indicated in the upper portion of Figure 2.

The strip 23 of gummed paper is next placed in position. For this purpose it is extended through all of the openings, and bent down and made to adhere upon adjacent portion of the back leaf 7 and the adjacent portions of the front leaf 6, the front leaves 14 and 15, and the top leaf 16.

As may be understood from Figure 2, the extreme top of the device is practically a handle of laminated form, made up of a number of thicknesses of the leaves, and bounded by the openings therein. This handle possesses considerable strength, which is greater because the wear leaf 18 partially encircles the handle. A band 24, grasping the handle, is indicated by dotted lines.

The gummed strip 23 serves not only as a closure seal for the box, but also as a reinforcing member for strengthening the device.

While the box here shown has practically the form of a wedge, it is obvious that this form may be varied within reasonable limits by suitably proportioning the different portions of the blank shown in Figure 1.

It will be noted that the box has no shoulders, and is broad at its base. The result is that if anything heavy is placed in the box, the stress upon the sides of the box, due to the weight of the contents, is necessarily exerted along lines which are almost straight, extending from the bottom to the top of the box. This increases the strength of the box, as any kind of a strain, such as would tend to tear the material, is distributed to the best advantage.

This principle is illustrated by the fact that if any ordinary bag or box be provided with a handle and subjected to a testing strain due to a weight carried within the box, the tendency of this weight is to distort the box, and in distorting it to bring it into the proximate form of a wedge or a cone. Hence there is an engineering advantage in giving the box, at the start, the form of a wedge.

In the form shown in Figure 4 the box has a little different shape at its top, the handle being virtually a little thicker; and the cross thickness of the box at its top is a little greater. These details however are immaterial.

The handle box above described admits of general use for carrying articles by hand. Its use is therefore not limited to any class of commodities and is not limited to any particular branch of trade. It may be employed to advantage in carrying bottles containing soft drinks or other liquids, and for returning these bottles to the store or other place where they belong.

It will be noted that my improved handle box promotes privacy, in that there is nothing in the form of the box to suggest the nature of the contents thereof.

I do not limit myself to the precise construction shown, as variations may be made therein without departing from my invention, the scope of which is commensurate with my claims.

Having thus described my invention, what I claim as new and desire to secure by Letters Patent is as follows:—

1. In a handle box the combination of a bottom panel, a front leaf and a back leaf extending from said bottom panel, a pair of side leaves extending from said front leaf, a pair of side leaves connected with said back leaf, a top leaf extending from said back leaf, and a pair of additional front leaves, said back leaf, said top leaf and all of said front leaves being each provided with an opening and with a narrow portion partially bounding said opening, all of said leaves being so positioned that one overlaps another, said openings being in registry with each other and said narrow portions together forming a handle.

2. In a handle box the combination of a bottom panel, a front leaf and a back leaf extending from said bottom panel, a pair of side leaves and a top leaf extending from said back leaf, each of said leaves being provided with an opening, said side leaves being folded upon said back leaf said front leaf and said back leaf being brought together and said top leaf being folded over said front leaf, all of said openings being in registry with each other.

3. In a handle box the combination of a bottom panel, a front leaf and a back leaf extending from said bottom panel, a pair of side leaves extending from the edges of said back leaf, and a top leaf extending from said back leaf and integral therewith, each of said leaves being provided with an opening, said side leaves being folded upon said back leaf, said front leaf and said back leaf being brought together and said top leaf being folded over said front leaf and said side leaves, said top leaf being provided with a portion extending through the openings in said front leaf and said back leaf, and serving as a wear leaf.

4. In a handle box the combination of a bottom panel, a front leaf and a back leaf extending from said bottom panel, a top leaf extending from said back leaf, and a pair of side leaves, each of said leaves having an opening, and being so folded that all of said openings are substantially in registry, portions of said leaves as bounded by said openings being grouped together and constituting a handle of laminated form.

5. In a handle box the combination of a bottom panel, a back leaf, a front leaf and a pair of side leaves all formed into a hollow container, each of said leaves having an opening, said leaves being so folded that one overlaps another and that the opening in one leaf is thus in registry with an opening in each of the other leaves, portions of said leaves as bounded by said openings being grouped together and constituting a handle of laminated form, one of said leaves being provided with a portion extending through the openings in the other leaves and serving as a wear leaf.

6. A substantially wedge shaped handle box comprising a bottom panel, a pair of relatively short bottom leaves extending laterally therefrom, a front leaf and a back leaf extending from said bottom panel, a pair of triangular side leaves connected with said front leaf, and a pair of triangular side leaves connected with said back leaf, said triangular side leaves extending in opposite directions from the edges of said front leaf and said back leaf, and being arranged to overlap each other and the bottom leaves, and said front and back leaves inclining upwardly toward each other and being secured together at their upper ends independently of said bottom and side leaves.

7. In a substantially wedge shaped handle box the combination of a bottom panel, relatively short bottom leaves extending therefrom, a front leaf and a back leaf extending from said bottom panel, a pair of triangular side leaves connected with said front leaf, a pair of triangular side leaves connected with said back leaf, the front leaf and the back leaf being in engagement with each other at their upper ends independently of said bottom leaves, the side leaves of said front leaf and said back leaf overlapping said bottom leaves, and a top leaf carried by said back leaf and folded to overlap the adjacent portion of said front leaf.

8. In a substantially wedged shaped handle box the combination of a bottom panel, relatively short bottom leaves extending therefrom, a pair of main leaves, comprising a front leaf and a back leaf, extending from said bottom panel, a pair of triangular side leaves connected with said front leaf, a pair of triangular side leaves connected with said back leaf, the front leaf and the back leaf being in engagement with each other at their upper ends independently of said bottom leaves, the pair of side leaves of said front leaf and said back leaf overlapping said bottom leaves and overlapping each other, and a pair of overlapping leaves extending from one of said pairs of side leaves and overlapping adjacent portions of the opposite main leaf.

9. A substantially wedge shaped handle box comprising a bottom panel, a pair of relatively short bottom leaves extending laterally therefrom, a front leaf extending from said bottom panel, a back leaf extending from said bottom panel, a pair of triangular side leaves extending from said front leaf, a pair of triangular side leaves extending from said back leaf, said triangular side leaves extending in opposite directions from the edges of the respective front and back leaves and overlapping each other and the bottom leaves, said front and back leaves inclining upwardly toward each other so that their upper edge portions engage together, parts extending from one of said mentioned pairs of triangular side leaves and overlapping each other, and a top leaf interfolded with said last mentioned overlapping parts and with said front and back leaves to hold said parts and said leaves connected.

10. A substantially wedge shaped handle box comprising a bottom panel, a pair of relatively short bottom leaves extending laterally therefrom, a front leaf extending from said bottom panel, a back leaf extending from said bottom panel, a pair of triangular side leaves extending from said front leaf, a pair of triangular side leaves extending from said back leaf, said triangular side leaves extending in opposite directions from the edges of the respective front and back leaves and overlapping each other and the bottom leaves, said front and back leaves inclining upwardly toward each other so that their upper edge portions engage together, parts extending from one of said mentioned pairs of triangular side leaves and overlapping each other, said overlapping parts and the front and back leaves having mating apertures therethrough, and a top leaf having a portion extending through said mating apertures and interfolded with said last mentioned overlapping parts and with said front and back leaves to hold said parts and said leaves connected.

11. A substantially wedge shaped handle box comprising a bottom panel, front and back leaves extending from opposite sides of said bottom panel and inclining upwardly so that their upper edge portions engage together, a pair of triangular side leaves extending from opposite sides of one of said mentioned leaves and having parts continuing therefrom and overlapping the other mentioned leaf, said overlapping parts and said front and back leaves having mating apertures therethrough, and a top leaf having a part folded through said mating apertures to hold all of said elements assembled in box forming relation.

Signed at New York city, in the county of Bronx and State of New York, this 3rd day of August, 1929.

MALVIN LICHTER.